US012729660B2

(12) United States Patent
Kolkman

(10) Patent No.: US 12,729,660 B2
(45) Date of Patent: Sep. 8, 2026

(54) INJECTOR FOR GASEOUS FUEL

(71) Applicant: BORGWARNER LUXEMBOURG AUTOMOTIVE SYSTEMS S.A., Bascharage (LU)

(72) Inventor: Manfred Kolkman, Messancy (BE)

(73) Assignee: PHINIA Delphi Luxembourg SARL, Belvaux (LU)

( * ) Notice: Subject to any disclaimer, the term of this patent is extended or adjusted under 35 U.S.C. 154(b) by 230 days.

(21) Appl. No.: 18/697,105

(22) PCT Filed: Sep. 23, 2022

(86) PCT No.: PCT/EP2022/076522

§ 371 (c)(1),
(2) Date: Mar. 29, 2024

(87) PCT Pub. No.: WO2023/052263

PCT Pub. Date: Apr. 6, 2023

(65) Prior Publication Data

US 2024/0392736 A1 Nov. 28, 2024

(30) Foreign Application Priority Data

Sep. 30, 2021 (GB) ...................................... 2114063

(51) Int. Cl.
*F02M 21/02* (2006.01)

(52) U.S. Cl.
CPC .... *F02M 21/0269* (2013.01); *F02M 21/0281* (2013.01); *F02M 21/0206* (2013.01); *F02M 2200/852* (2013.01); *F02M 2200/853* (2013.01)

(58) Field of Classification Search
CPC ........... F02M 21/0206; F02M 21/0248; F02M 21/0257; F02M 21/026; F02M 21/0269;
(Continued)

(56) References Cited

U.S. PATENT DOCUMENTS 2,667,155 A 1/1954 Paluch et al.
3,062,198 A 11/1962 Richardson
(Continued)

FOREIGN PATENT DOCUMENTS

DE 1259634 B 1/1968
DE 102015225175 A1 * 6/2017 ........... F02M 61/166
(Continued)

OTHER PUBLICATIONS

International Search Report for PCT/EP2022/076522 dated Dec. 8, 2022, 3 pages.
(Continued)

*Primary Examiner* — Darren W Gorman
(74) *Attorney, Agent, or Firm* — WARNER NORCROSS + JUDD LLP

(57) ABSTRACT

A fuel injector suitable for gaseous fuels comprises an injection nozzle having a tip region that is shaped to define a valve seat that extends about a central outlet opening and an outward opening injection needle slidably received in the injection nozzle. A nozzle cap is received over the tip region of the injection nozzle, wherein the tip region and the nozzle cap are configured to define an thermal barrier layer between them to reduce thermal transfer. The nozzle cap is releasably clipped onto the tip region. It comprises a slot and is configured to be compressible in a radial direction so as to reduce its outer diameter.

11 Claims, 6 Drawing Sheets

(58) Field of Classification Search
CPC ........... F02M 21/0275; F02M 21/0281; F02M 61/08; F02M 2200/852; F02M 2200/853
See application file for complete search history.

(56) References Cited

U.S. PATENT DOCUMENTS

| | | | | |
|---|---|---|---|---|
| 6,390,121 | B1 * | 5/2002 | Steinruck | F02M 63/0054 137/514 |
| 6,921,033 | B2 * | 7/2005 | Reiter | F02M 51/0671 277/631 |
| 2005/0082393 | A1 | 4/2005 | Borissov | |
| 2017/0306891 | A1 * | 10/2017 | Hohl | F02M 21/0275 |
| 2017/0328310 | A1 | 11/2017 | Hohl | |
| 2018/0363591 | A1 * | 12/2018 | Etcheverry | F02M 21/0275 |
| 2024/0035431 | A1 * | 2/2024 | Raab | F02M 21/0263 |
| 2024/0344488 | A1 * | 10/2024 | Eismark | F02M 21/0263 |

FOREIGN PATENT DOCUMENTS

| | | | | |
|---|---|---|---|---|
| DE | 102017219932 | A1 | 5/2019 | |
| DE | 102018211401 | A1 * | 1/2020 | F02M 21/0269 |
| EP | 2636880 | A1 * | 9/2013 | F02M 61/14 |
| GB | 2575111 | A | 1/2020 | |
| WO | WO-2013122318 | A1 * | 8/2013 | F02M 21/0269 |
| WO | 2016082986 | A2 | 6/2016 | |

OTHER PUBLICATIONS

Machine assisted English translation of DE102017219932A1 obtained from https://worldwide.espacenet.com/patent on Mar. 26, 2024, 13 pages.

Machine assisted English translation of DE1259634B obtained from https://worldwide.espacenet.com/patent on Mar. 26, 2024, 4 pages.

Machine assisted English translation of WO2016082986A2 obtained from https://worldwide.espacenet.com/patent on Mar. 26, 2024, 14 pages.

* cited by examiner

INJECTOR FOR GASEOUS FUEL

CROSS-REFERENCE TO RELATED APPLICATIONS

This application is the U.S. National Stage of International Application No. PCT/EP2022/076522 filed on 23 Sep. 2022, which claims priority to and all advantages of United Kingdom Application No. 2114063.7 filed on 30 Sep. 2021, the contents of which are incorporated herein by reference.

TECHNICAL FIELD

The present invention relates generally to a configuration of a fuel injector suitable for injecting a gaseous fuel such as hydrogen into a combustion chamber of an internal combustion engine. The injector may be suitable for injection of other fuels.

BACKGROUND OF INVENTION

Different types of fuel injectors for gaseous fuels are known. One approach is a so-called ‘inward opening’ fuel injector in which an injector valve needle is configured to lift away from a valve seat against the flow direction of fuel so as to open a set of injector ports at the tip of the injector. Another approach is a so-called ‘outward opening’ fuel injector in which an injector valve needle, which is also known as a ‘pintle’, is configured to open in a direction that is the same as the fuel flow direction.

One challenge particularly associated with outward opening fuel injectors is the thermal effects of the combustion processes. The combustion properties of hydrogen tend to cause excessive heating of fuel injectors due to the tendency toward high flame temperatures, low ignition energy and small quenching distances. Uncontrolled heating of the injector tip can cause undesirable auto-ignition or detonation of the fuel-air mixture and can lead to excessive wear of the injector. It is therefore desirable to control and improve the flow of thermal energy into and out of the injector in order to address these issues.

US 2017/328310 A1 discloses a gas injector with a cooling ring and a shielding element, wherein the cooling ring is fixed in place on the gas injector with the aid of the two welded joints. More precisely, the cooling ring has a first contact area with the shielding element and a second contact area with the cylinder head. The cooling ring has an axial slot and is connected to the shielding element with the aid of the first welded joint. The cooling ring is also connected to the valve body by the second welded joint.

SUMMARY OF THE INVENTION

Against this background, the invention provides a fuel injector suitable for gaseous fuels as claimed in claim 1. The fuel injector comprises an injection nozzle having a tip region that is shaped to define a valve seat that extends about a central outlet opening; an outward opening injection needle slidably received in the injection nozzle, wherein the injection nozzle further includes a nozzle cap that is received over the tip region of the injection nozzle, wherein the tip region and the injection cap are configured to define a thermal barrier layer between them to reduce thermal transfer.

Beneficially, the thermal barrier layer that is defined between the tip region and the injector cap reduces the thermal energy that is transferred from the nozzle cap to the nozzle and, in doing do, promotes thermal transfer into a bore of a cylinder head into which the injector is received in use. The barrier layer has an insulation effect.

The invention therefore extends to an injector arrangement including a fuel injector as defined above, which is received in a bore defined in a wall at least partly bounding a combustion chamber. The injection nozzle and the nozzle cap are received in the bore such that the nozzle cap is in direct thermal contact with the bore. Direct thermal contact may mean that the bore and the nozzle cap have comparable diameters so that a tight fit is achieved between the nozzle cap and the bore thereby promoting thermal conductivity between those components.

Notably, the nozzle may have a length that is substantially the same diameter as the nozzle cap so that the nozzle and the cap can be fitted into the bore by way of a tight fit. Preferably some radial expansion of the nozzle cap is beneficial to ensure good thermal contact.

As the skilled person would understand, the term ‘outward opening’ is used to refer to an injector in which the valve needle is configured to be movable between a first position in which a head of the needle seals against the valve seat to prevent fuel from being delivered through the central outlet opening, and a second position in which the head of the needle moves away from the valve seat to permit fuel to be delivered through the outlet opening, wherein when moving from the first position to the second position the injection control head moves in a fuel delivery direction.

The injector may be configured such that the nozzle cap is received over a reduced-diameter portion of the tip region of the injection nozzle. As a result of this configuration, a radially outer surface of the nozzle cap may be provided with substantially the same cross section profile as the tip region, which promotes thermal conductivity between the nozzle cap and the bore within which it is installed.

The thermal barrier layer may be defined by a radial clearance between an outer surface of the tip region of the nozzle and an inner surface of the nozzle cap. The clearance may preferably be greater than 50 micrometres in order to ensure a sufficient thermal barrier. Other options may be for the radial clearance to be filled with an insulating material. Optionally, an insulating coating may be applied to the outer surface of the tip region and/or to the inner surface of the nozzle cap, whereupon the radial clearance may be reduced or eliminated.

For ease of assembly, the nozzle cap and the tip region of the nozzle are configured so that the end cap is releasably clipped onto the tip region of the nozzle. This means that the nozzle cap can readily be assembled onto the nozzle without the use of welding or other bonding techniques which would inhibit the ability of the nozzle cap to expand so as to press against the cylinder head bore to make good thermal contact therewith.

The nozzle cap is configured to be compressible in a radial direction so as to reduce its outer diameter. The compressibility is achieved by the provision of a slot that extends from a first end to a second end of the nozzle cap. The slot may extend in a straight path, which is simple to manufacture. Alternatively, the slot may extend along a path that is not straight, for example a meandering or zigzag path.

In some embodiments, the nozzle cap may define an open area that leaves the outlet opening in the nozzle substantially unrestricted when projecting the profile of the nozzle below it. Expressed in another way, the nozzle cap may be configured so as not to overlap the outlet opening of the nozzle. However, in other embodiments, the nozzle cap may further define a hood portion that extends beyond the tip region of the nozzle and provides a fuel delivery guide. The hood portion may be shaped to define a bulbous cavity or chamber which at least partially encloses the outlet opening of the nozzle. In this way, the hood portion defines a sac volume of the nozzle which promotes mixing of air and fuel. Moreover, the hood portion may be provided with one or more exit openings to guide the flow of fuel from the nozzle. The guiding function may be different from what could be achieved simply by the nozzle itself without the nozzle cap. The hood portion may be provided with a plurality of outlet openings, the positions of which are selected to achieve predetermined spray shape objectives.

Further optional and advantageous features are referenced in the detailed description and the appended claims.

BRIEF DESCRIPTION OF THE DRAWINGS

So that the invention may be better understood, reference will now be made by way of example only to the following drawings in which.

DETAILED DESCRIPTION OF THE EMBODIMENTS

Figure 1:
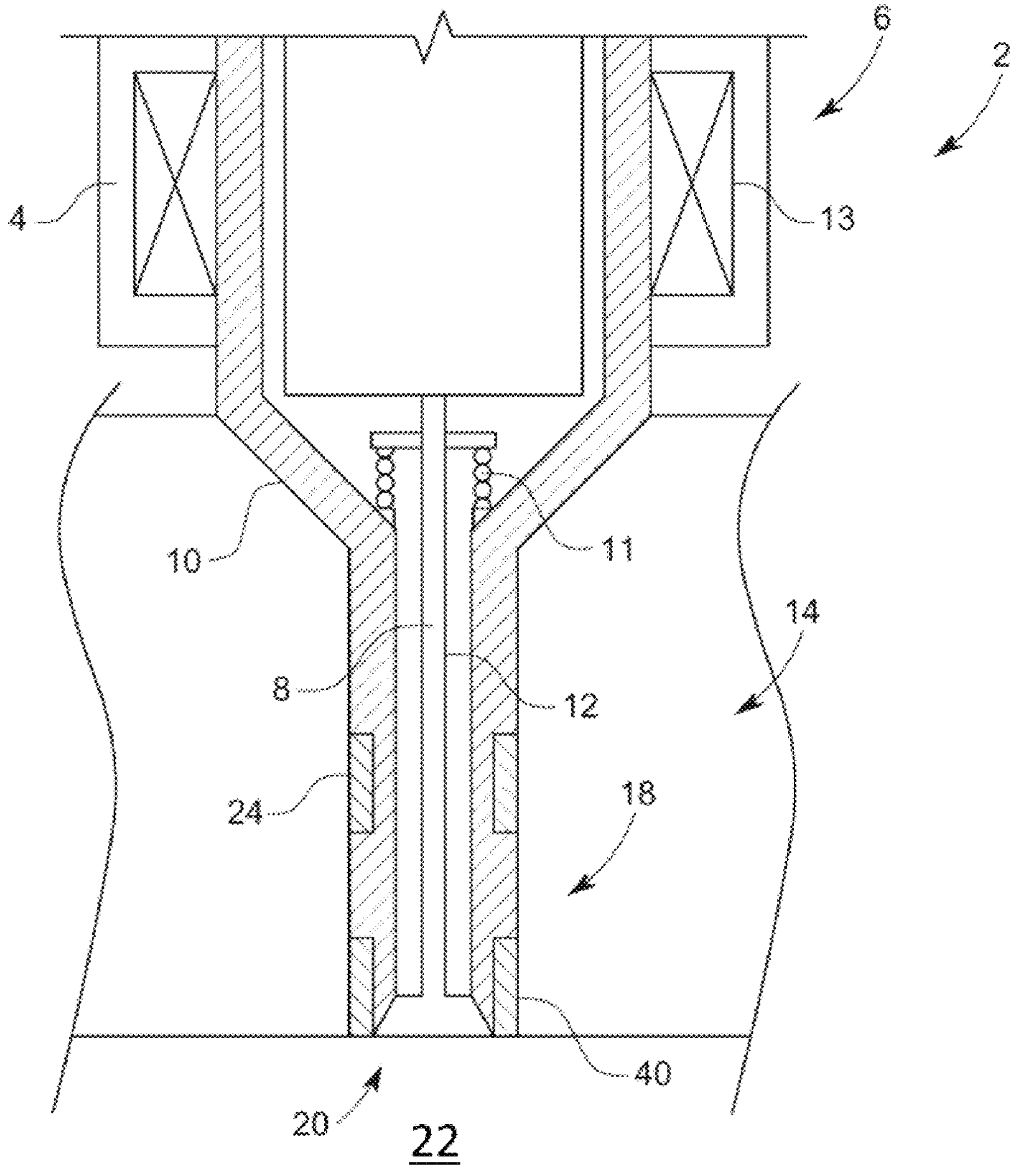
FIG. 1 is a schematic view of a fuel injector suitable for use with gaseous fuels such as hydrogen in accordance with an embodiment of the invention.

With reference to FIG. 1, a direct injection fuel injector 2 comprises an injector body 4 that houses an actuator arrangement 6 that is configured to act on an injection valve needle or 'pintle' 8 which is contained in an elongated valve housing or 'nozzle' 10.

The fuel injector 2 is an outward opening type such that the valve needle 8 is arranged to move downwards, in the orientation of the figures, in order to initiate a delivery of fuel, and to move upwards to terminate fuel delivery. The nozzle 10 houses a supply of fuel which extends down into an annular chamber 12 that surrounds the valve needle 8. When the valve needle 8 opens, fuel is thus delivered from the nozzle 10 into the combustion chamber. Therefore, the valve needle 8 moves in the same direction as the flow of fuel through the nozzle 10 during an injection event.

The valve needle 8 is biased into a closed position by way of a closure spring 11. Actuation of the valve needle 8 is achieved by way of an electromagnetic actuator 13. Although in this example an electromagnetic actuator is used, other forms of actuation are acceptable, such as piezoelectric actuators.

As will be appreciated in FIG. 1, a significant portion of the injector 2, and particularly the nozzle 10 thereof, is fitted within a cylinder head 14 of an engine. The nozzle 10 is held in a passage or bore 16 that is shaped to receive the nozzle 10 in a relatively loose fit. The nozzle 10 and the passage 16 are configured to that a tip region 18 of the nozzle 10 is positioned at a lower opening 20 of the passage which opens into a combustion chamber 22 of the engine.

The general form of the fuel injector 2 is not central to the injection so further detailed discussion will be avoided so as not to obscure the invention. However, discussion will focus on the details of the nozzle 10 which is shown in an enlarged form in FIGS. 2 and 3.

The nozzle 10 carries a seal 24. The seal 24 is in the form of a ring-shaped element which is received in a correspondingly-shaped annular slot 28 formed in the outer surface of the nozzle 9. The seal 24 forms a tight seal with the bore 16 of the cylinder head 14 as a measure to guard against combustion gases blowing by the nozzle 10. The seal 24 has a rectangular cross section as shown here, but other profiles would be acceptable, the key functionality being to create a gas-tight seal between the nozzle 10 and the bore 16.

The tip region 18 is shaped to define a seal with the valve needle 8, as is generally known. As such, the valve needle 8 includes a head 30 which defines a frustoconical sealing surface 32 on its upper side, as shown in the drawings. The sealing surface 32 of the head 30 is engageable with a correspondingly-shaped valve seat 34 provided on a lower surface of the tip region 18. That valve seat 34 defines a leading edge 35 of the nozzle.

As is typical with outward opening fuel injectors, that valve seat 34 is circular in form and so defines a circular opening at the end of the nozzle. The head 30 of the valve needle 8 fills the opening and so defines a narrow annular outlet opening 36, when the valve needle 8 is in an open position, which shapes the flow of fuel into a conical jet. The respective geometries of the valve seat 34 and the head 30 can influence the shape and direction of the jet of fuel during delivery, but the precise details of this are not central to the invention and so will not be the focus of further discussion.

The valve needle 8 is movable between a first position in which the head 30 seals against the valve seat 34 to prevent fuel being delivered through the outlet opening 36 and a second position in which the head 30 moves outwardly from the nozzle 10 thereby spacing the head 30 from the valve seat 34 which therefore allows fuel to be delivered in a fuel delivery direction. It will therefore be appreciated that the fuel flow direction is the same direction as the opening movement of the valve needle In use, it is important to control the temperature of the tip region 18 of the nozzle 10. If the fuel within the nozzle and/or the sealing ring 24 is heated excessively, then this risks auto-ignition in the combustion chamber upon delivery through the outlet opening and can also degrade the mechanical properties of these components.

To guard against this, the nozzle 10 includes an end cap or "nozzle cap" 40. The nozzle cap 40 is fitted onto, or received on to, the tip region 18 of the nozzle 10 and functions to control the thermal energy that is transferred to the nozzle 10 in use during combustion. Advantageously, the nozzle cap 40 provides a thermally conductive pathway which encourages thermal energy to transfer from the nozzle cap 40 and into the surrounding material of the cylinder head 14 in preference to being transferred into the tip region 18 of the nozzle 10. As a result, the nozzle cap 40 can guard against excessive hot spots within the nozzle 10.

The nozzle cap 40 is collar-shaped, and as such has a short cylindrical profile defining an upper edge 41, a lower edge 42 and an open central area 44. Due to its shape, the end cap 40 defines a radial outer surface 45 and a radial inner surface 46 which together define a thickness dimension T. Note that in this embodiment, the thickness dimension of the nozzle cap 40 is substantially uniform along its length.

As will be apparent from the figures, the outer diameter of the nozzle cap 40 and the outer diameter of the adjacent part of the nozzle 10 are substantially equal. Therefore, the outer surface 45 of the nozzle cap 40 is substantially flush with the outer surface of the nozzle 10. To allow this, the tip end 18 of the nozzle 10 defines a reduced diameter region 48. The reduced diameter region 48 is defined between the leading edge 35 of the tip region 18 and a step or shoulder 49 of the nozzle 10. The shoulder 49 is defined at a lower position on the nozzle 10 than the position of the seal 16.

From the figures, it will be appreciated that the radius of the tip region 18 is less than the radius of the nozzle 10 by an amount that is comparable to the thickness dimension T of the nozzle cap 40. This configuration is useful to allow the nozzle 10 and the nozzle cap 40 to be fitted within the uniform bore 16 in the cylinder head 14.

The nozzle cap 40 is releasably retained on the tip region 18 nozzle 10. Notably, it is not fixed by welding or other bonding process. The geometry of the nozzle cap 40 is such that it can be slipped over the tip region 18 loosely so as to define a radial clearance or gap G between the inner surface 46 of the nozzle cap 40 and the outer surface 47 of the end tip region 18. Retention is achieved by a retention feature 50 defined in part by the tip region 18 and in part by the nozzle cap 40. In the illustrated embodiment, the retention feature 50 takes the form of an annular rib that extends about the outer surface of the tip region 18 that engages with an annular groove 54 which extends about the inner surface of the nozzle cap 40.

Figure 2:
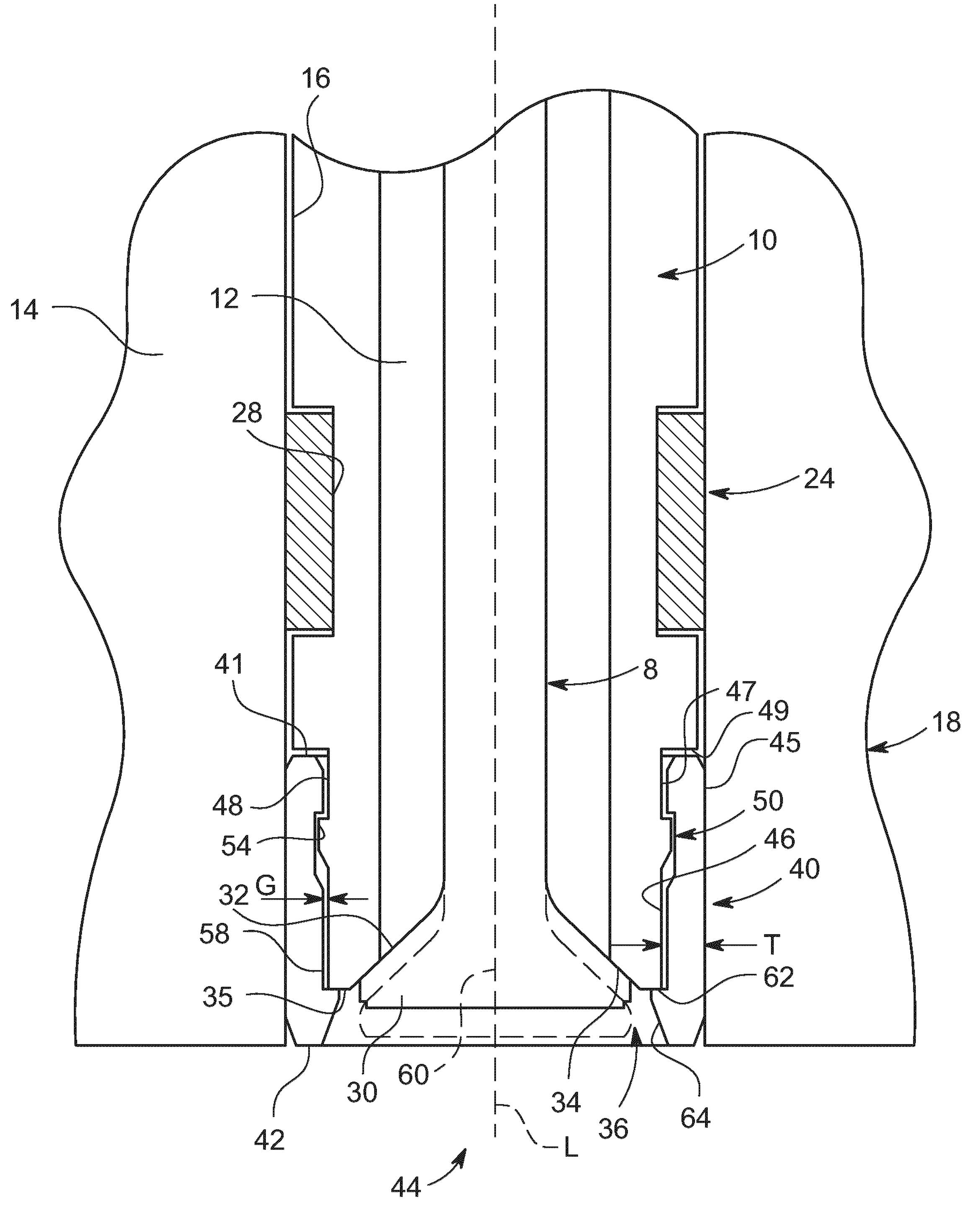
FIG. 2 is a cross section through a nozzle region of the injector in FIG. 1, including an end cap configuration in accordance with an embodiment of the invention.

As is shown clearly in FIG. 2, the annular rib 50 sits inside the annular groove 54 and so functions to retain the nozzle cap 40 on the tip region 18.

Due to the way in which the nozzle cap 40 is clipped over the tip region 18 thereby defining a radial clearance G, a thermal barrier 58 is created between those components thereby providing some thermal insulation. The effect of this insulation layer is to establish thermal break or barrier between the nozzle cap 40 and the tip region 18 which reduces the transmission of thermal energy. It is currently envisaged that a radial gap having a dimension of between 100 and 200 micrometres would be sufficient, although this is exemplary and some variants around these values is acceptable. Generally, the gap dimension is driven my manufacturing tolerances, as it is preferred for the gap to be as small as possible. In known configuration of injectors, typically injector caps are welded onto the tip of the inject which, contrary to the invention, promotes thermal transfer and increases the risk of hotspots.

In the illustrated embodiment, the insulation layer 58 is formed by the air gap G as this provides sufficient insulative properties to reduce the thermal energy transfer between the nozzle cap 40 and the tip region 18 of the nozzle 10.

Notably, the air gap G is substantially continuous in this embodiment, and although this is preferred, it is not crucial. Therefore, some areas of contact may be acceptable between these components yet still retaining the benefits of the invention.

The material of the nozzle cap 40 is preferably a high temperature resistant metal such as a suitable stainless steel or similar alloy. An example of a suitable material is Inconel®. The material should be capable of withstanding the combustion temperatures of hydrogen (approx. 530 degrees centigrade) without glowing, as this would provide an undesirable source of ignition.

In order for the nozzle cap 40 in order to be slipped over the tip region 18 and clipped in place, in the illustrated embodiment the nozzle cap 40 is provided with a degree of flexibility in the radial direction so that its outer diameter is able to increase and decrease slightly. To achieve this effect, the nozzle cap 40 comprises an axial slot 60.

As can be seen in FIG. 2, the axial slot 60 in this embodiment is linear and extends between either end of the nozzle cap 40 along a straight path. The axial slot 60 therefore makes the nozzle cap 40 resemble a circlip that has some radial resilience.

Notably, the width of the axial slot 60, that is to say the dimension of the slot in the circumferential direction of the nozzle cap 40 should be kept small so as to limit the travel of combustion gases up the slot 60 from the leading edge of the nozzle cap 40. Currently preferred is for the slot to be at least 50 micrometres in width, and preferable between 50 and 100 micrometres. This is to ensure that the width of the gap is sufficient to provide the nozzle cap 40 with enough radial flexibility, but also small enough to limit the travel of combustion gases up the slot 60.

Note that the above dimension of the slot 60 is given as the dimension when the nozzle 10 together with the nozzle cap 40 are installed in the bore 16 of the cylinder head 14. Before installation, it is envisaged that the geometry of the nozzle cap 40 such that its outer diameter is slightly larger than the internal diameter of the bore 14. During installation, therefore, the nozzle cap 40 is arranged to be pushed into the bore 14 by way of a press fit. This urges the nozzle cap 40 to be compressed inwards in a radial direction so that the outer surface 45 of the nozzle cap 40 is urged into engagement with the surface of the bore 16. This ensures a tight fit that promotes efficient transfer of thermal energy.

Figure 3:
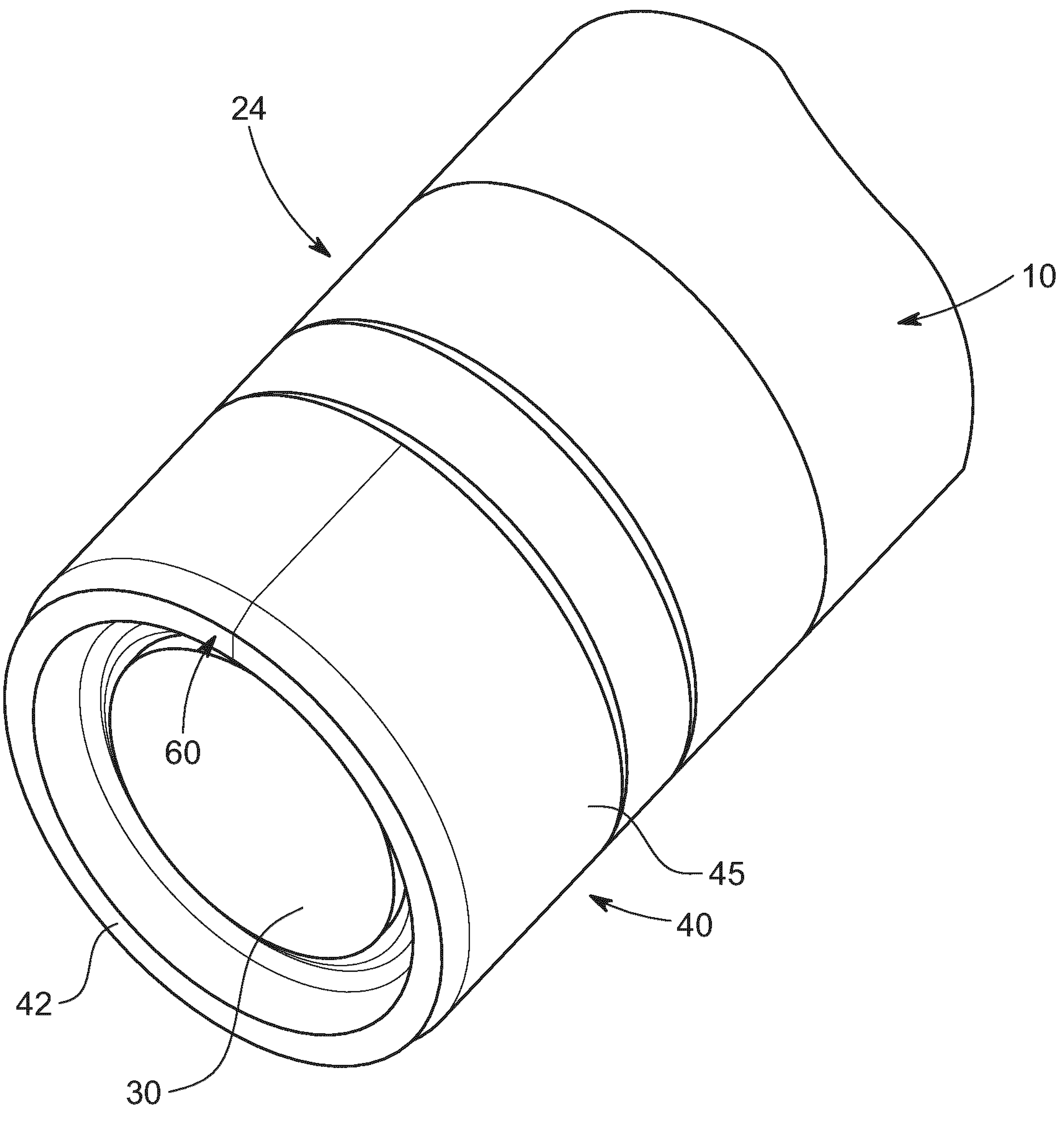
FIG. 3 is a perspective view of the nozzle region of the injector in FIG. 1.

As will be noted from FIGS. 2 and 3, in the illustrated embodiment the central area 44 of the nozzle cap 40 exposes the entirety of the head 30 of the valve needle 8 and so provides a substantially unobstructed flow of fuel. In fact, the nozzle cap can be shaped to control the shape of the fuel flow that is injected into the combustion chamber. Here, the lower edge 42 of the nozzle cap 40 has a small radial lip 62 that extends a small distance in the radially inwards direction. The configuration of the lip 62 means that the nozzle cap 40 at least partly overlaps or covers the end of the nozzle 10 which limits direct heat exposure to combustion gases. The radial lip 62 defines a circumferential inner surface 64 that is inclined with respect to the longitudinal axis L of the nozzle 10 (by about 30 degrees in this embodiment) which contributes to shaping the injected fuel into a conical jet.

Furthermore, it will be noted that the radial lip 62 extends slightly over the leading edge 35 of the nozzle 10. Beneficial aspects of this is that 1) it positions the inner surface 64 of the radial lip 62 close to the edge of the outlet opening 36 to improve the spray shaping; 2) it provides at least a partial cover to the leading edge 35 of the nozzle 10, thereby limiting heat exposure of the nozzle at this point; 3) it acts as an end stop to define an end point of travel for the nozzle cap 40 onto the reduced diameter tip region 18.

The illustrated embodiment shown in FIGS. 2 and 3 shows one option for providing spray shaping of the fuel delivery from the nozzle 10. However, the nozzle cap 40 can be modified to provide further spray shaping options.

Figure 4:
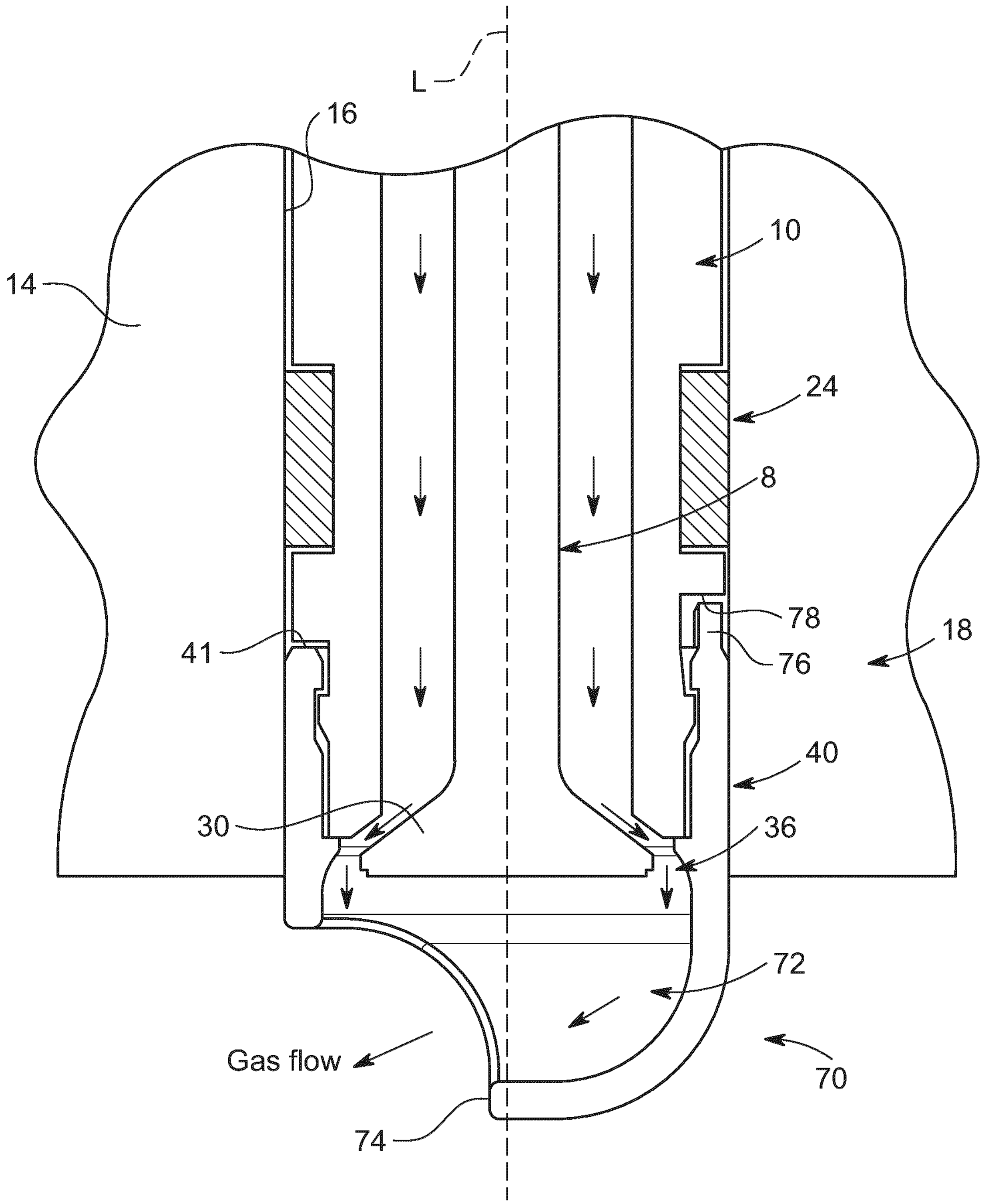
FIG. 4 is a cross section through a nozzle region including an end cap configuration in accordance with another embodiment of the invention.
Figure 5:
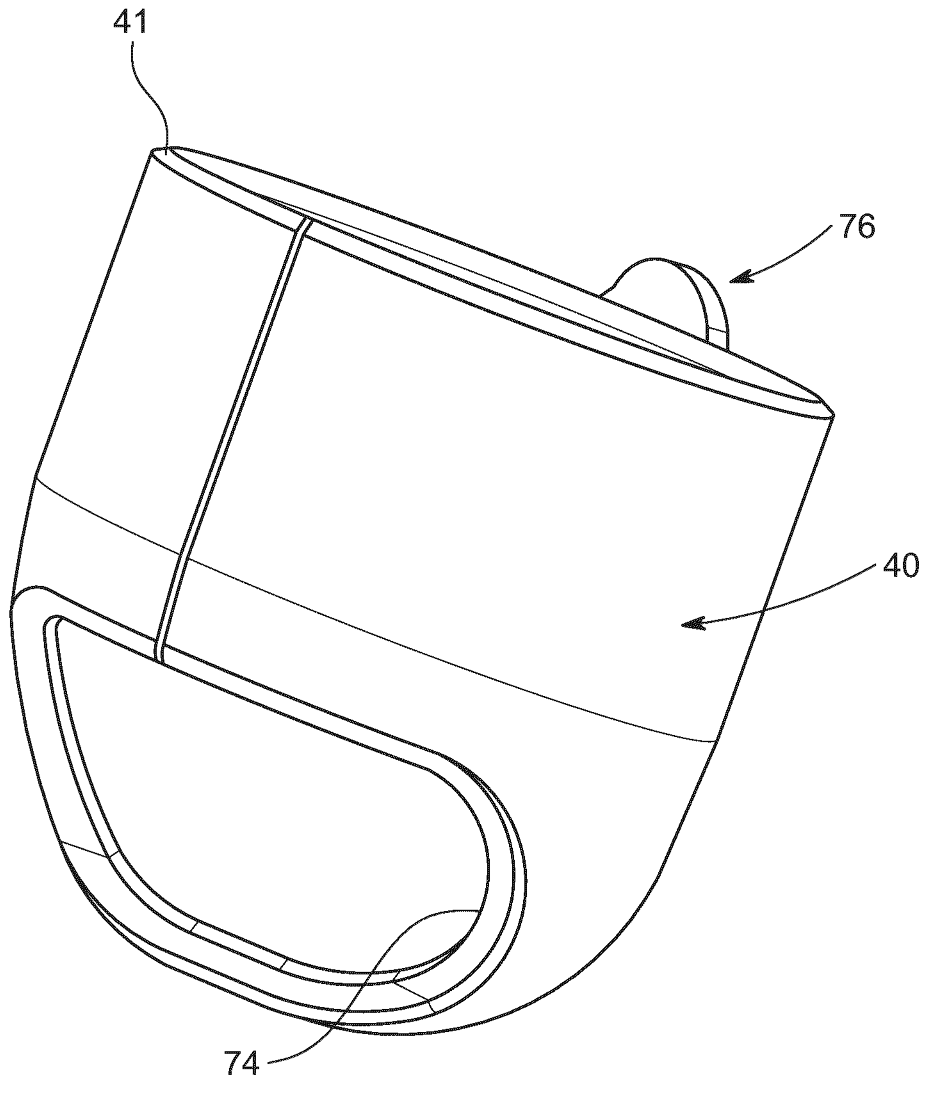
FIG. 5 is a perspective view of the nozzle region shown in FIG. 4.

An example of this is shown in the embodiment of FIGS. 4 and 5. Note that the embodiment shares many features of configuration with the previous embodiment so only the differences will be described. The same reference numerals will be used to define common parts or features.

The principal difference in the embodiment of FIGS. 4 and 5 is that the nozzle cap 40 includes a cowl or hood portion 70. As can be seen the hood portion 70 extends beyond the tip region 18 to partially enclose a bulbous chamber 72 beneath the head 30 of the valve needle 8. The hood portion 70 is penetrated by a hood opening 74. Although in theory the hood opening 74 may be defined by the hood portion 70 with any size and shape, in the illustrated embodiment it will be noted that the hood opening 74 is offset to one side. That is to say the hood opening 74 is offset from the longitudinal axis L of the nozzle 10.

The offset position of the hood opening 74 has the effect of controlling the spray direction from the nozzle 10 since the bulbous interior form of the hood opening 74 captures and redirected the flow of fuel exiting the output opening 36 of the tip region 18, as seen by the arrows in FIG. 4. The chamber 72 therefore constitutes a type of sac volume for the nozzle, which promotes mixing of the air and fuel during an injection event by controlling the spray direction to optimum parts of the combustion chamber.

Although the illustrated embodiment includes a single large hood opening 74, it should be appreciated that more than one opening may be provided. Those plurality of openings may be the same size, or different sizes and may be spaced regularly or irregularly about the hood portion 70.

Configuring the hood portion 70 with one or more angularly offset openings as described may have the effect of applying an angularly directed force to the nozzle cap 40. As can be seen particularly well, the opening 74 in the illustrated embodiment has a geometry that resembles a stadium shape or obround, which contributes to the spray shaping function of the nozzle cap 40. Such shape is exemplary only and other shapes would be acceptable.

To guard against any unwanted angular movement of the nozzle cap 40, it may be configured with rotational locking means. In the illustrated embodiment, the rotational locking means is embodied as a locking protrusion or tab 76. The locking tab 76 extends axially from the upper edge 41 of the nozzle cap 10 and is accommodated in a complementary notch 78 defined in the tip region 18. The mating between the tab 76 and the notch 78 therefore acts as a location feature during installation of the nozzle cap 10 on the tip region 18 and, once installed, prevent the nozzle cap 10 from rotating out of its selected position.

A single locking feature is likely to be sufficient for the purpose of rotationally locking the nozzle cap 10 to the tip region 18, although it should be appreciated that the configuration of the locking feature may take different forms as would be apparent to the skilled person.

Some variants on the specific embodiments have already been described. However, the skilled person would appreciate that further modifications could be made to the specific embodiments that do not depart from the scope of the invention as defined by the claims.

Figure 6:
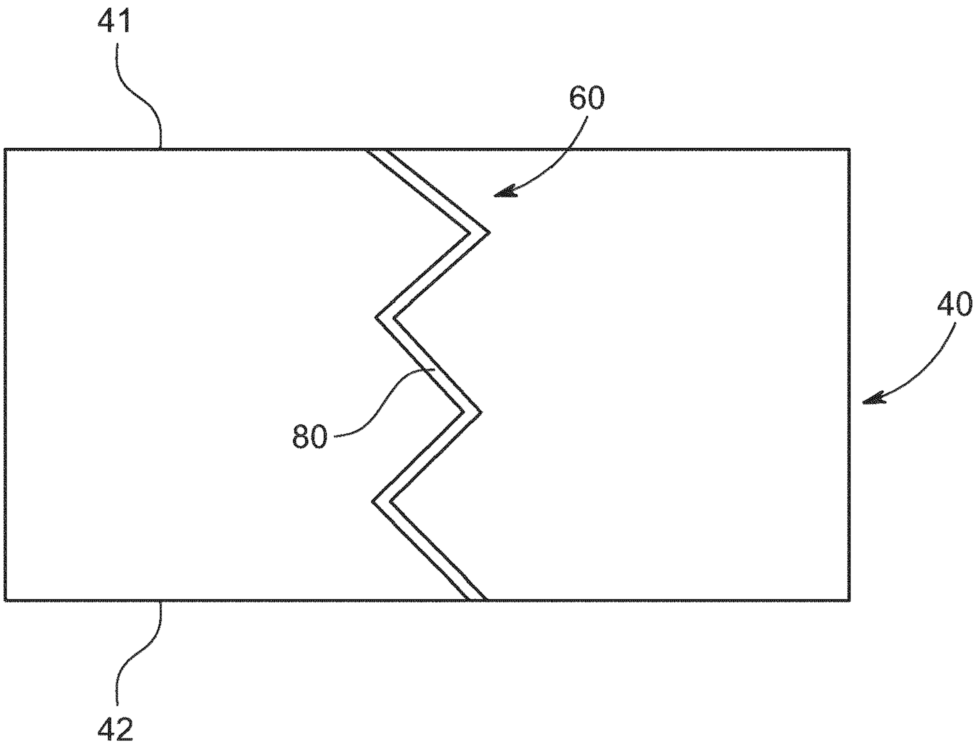
FIGS. 6 and 7 are alternative end cap configurations.
Figure 7:
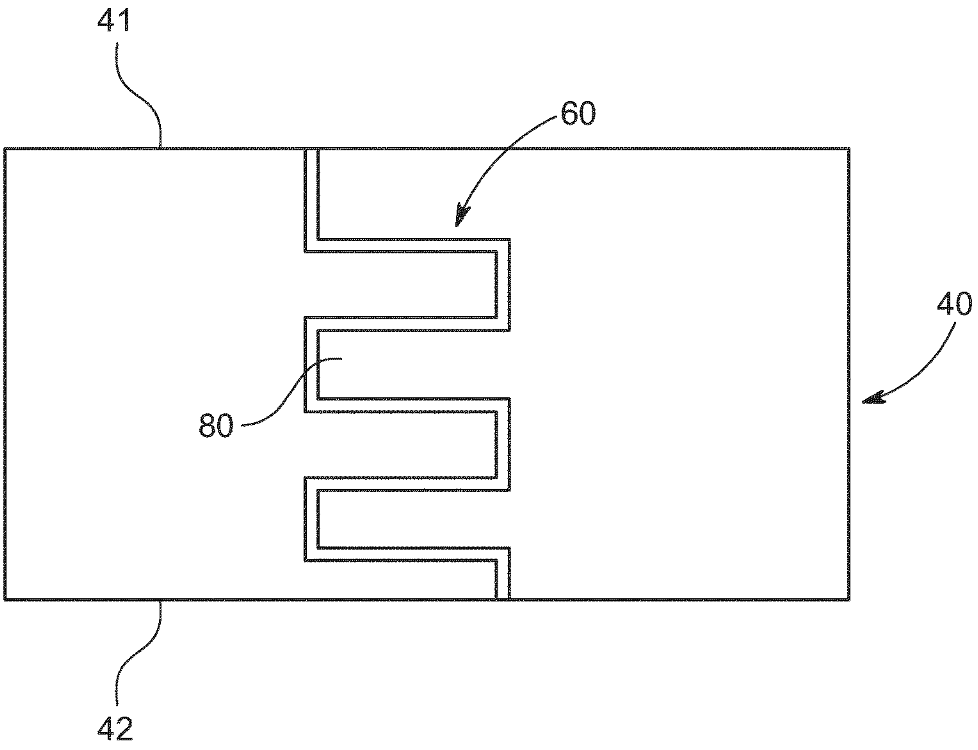

One exemplary variant is shown in FIGS. 6 and 7, each of which shows a nozzle cap 10 with a different form of axially extending slot 60. In the previous illustrated embodiment, the axially extending slot 60 extended along a straight path between the upper edge 41 of the nozzle cap 10 to the lower edge 42.

In FIG. 6, however, the axially extending slot 60 extends along an undulating path 80. More specifically the path is zigzag shaped, as shown here, as defined by a plurality of equal length sections that are disposed at equal angular intervals to one another.

In FIG. 7, the axial slot 60 again takes an undulating path 80 but instead of being zigzag, as in FIG. 6, the path 80 is shaped to define a plurality linked horizontal and vertical path segments.

Both of the undulating slot shapes shown in FIGS. 6 and 7 retain the ability of the nozzle cap 10 to contract and dilate. However, it is envisaged that the elongated paths 80 provide a more circuitous route for combustion gases and may be more effective at insulating the nozzle 10 from high combustion temperatures.

The invention claimed is:

1. A fuel injector suitable for gaseous fuels, comprising:

an injection nozzle having a tip region that is shaped to define a valve seat that extends about a central outlet opening; and an outward opening injection needle slidably received in the injection nozzle;

wherein the injection nozzle further includes a nozzle cap that is received over the tip region of the injection nozzle, wherein the tip region and the nozzle cap are configured to define a thermal barrier layer between them to reduce thermal transfer;

wherein the nozzle cap and the tip region of the injection nozzle are configured so that the nozzle cap is releasably clipped onto the tip region;

wherein the nozzle cap is configured to be compressible in a radial direction so as to reduce its outer diameter; and wherein the nozzle cap comprises a first end and a second end, and an axial slot that extends from the first end to the second end.

2. The fuel injector of claim 1, wherein the nozzle cap is received over a reduced-diameter portion of the tip region of the injection nozzle.

3. The fuel injector of claim 2, wherein a radially outer surface of the nozzle cap has substantially the same cross section profile as an adjacent part of the tip region.

4. The fuel injector of claim 1, wherein the thermal barrier layer is defined by a radial clearance between an outer surface of the tip region of the nozzle and an inner surface of the nozzle cap.

5. The fuel injector of claim 1, wherein the slot is linear.

6. The fuel injector of claim 1, wherein the nozzle cap defines an internal circumferential lip that abuts a leading edge of the tip region of the injection nozzle.

7. The fuel injector of claim 1, wherein the nozzle cap further defines a hood portion that extends beyond the tip region and provides a fuel delivery guide.

8. The fuel injector of claim 7, wherein the hood portion defines at least one outlet opening.

9. The fuel injector of claim 8, wherein the at least one outlet opening is offset from an injector centre axis.

10. The fuel injector of claim 1, wherein the nozzle cap includes a rotational locking feature that is configured to engage with the injection nozzle.

11. An injector arrangement including a fuel injector as claimed in claim 1, the nozzle of the fuel injector being at least partly received in a bore defined in a wall at least partly bounding a combustion chamber, wherein the injection nozzle and the nozzle cap are received in the bore such that the nozzle cap is in direct thermal contact with the bore to promote thermal transfer between the nozzle cap and the wall.

* * * * *